May 26, 1970 C. G. HAWKINS 3,514,024

TAPE BASKET STRIPPER APPARATUS

Filed Feb. 16, 1968

INVENTOR
CHARLES G. HAWKINS
BY [signature]
ATTORNEY

United States Patent Office 3,514,024

Patented May 26, 1970

3,514,024

TAPE BASKET STRIPPER APPARATUS

Charles G. Hawkins, Indianapolis, Ind., assignor to RCA Corporation, a corporation of Delaware Filed Feb. 16, 1968, Ser. No. 706,039
Int. Cl. B65h 17/32
U.S. Cl. 226—97 8 Claims

ABSTRACT OF THE DISCLOSURE

A basket for storing magnetic tape includes means adjacent the tape exit opening for preventing more than one strand of tape at a time from entering and passing through the basket exit opening.

This invention relates to tape duplicating apparatus, and in particular to apparatus for handling and storing an endless loop magnetic tape during a tape duplicating operation.

In a magnetic tape duplicating operation, a plurality of tape transports (slave units) are electrically synchronized to a master tape transport. The arrangement is such that information recorded on a tape which is passed through the master transport for scanning by transducers contained therein is simultaneously fed to the slave units for recording in unison on virgin tape in each of the slave units. The prerecorded master tape may be in the form of an endless loop, the bulk of which is stored in serpentine folds in a thin box-like enclosure or basket positioned beneath the master transport transducers. The tape is caused to feed into the basket through an opening in the top end of the enclosure after which it serpentinely stacks in layers upon itself. Withdrawal of the tape from the basket is through a narrow opening or slit in a lower side wall of the basket.

A problem encountered in this type of tape storage and handling arrangement is the tendency for more than one strand or fold of tape to be withdrawn from the basket exit opening at a time. This causes creases to form in the tape and the exiting strand of tape to experience high drag and a jerkiness of motion. The motion is reflected as wow and flutter in the output signal from the master transport transducer fed to the slave units. In addition, creases in the tape tend to reduce the tape life and also cause dropout, i.e., loss of signal, whenever a crease passes over a transducer head in the master transport.

It is an object of the present invention to provide an improved tape storage basket arrangement which alleviates the aforementioned problem.

In accordance with the present invention the wall portions forming the exit opening of the basket storage area are provided with at least one pair of oppositely disposed passageways communicating between the basket storage area and a source of compressed air. The passageways each open into the basket storage area at an angle such that the air is directed into the storage area toward opposite sides of the entering tape strand and away from the exit opening.

The novel features which are considered to be characteristic of the invention are set forth with particularity in the appended claims. The invention itself, however, both as to its organization and method of operation as well as additional objects and advantages thereof, will best be understood from the following description when read in connection with the accompanying drawing in which:

Figures 1, 2, 3:
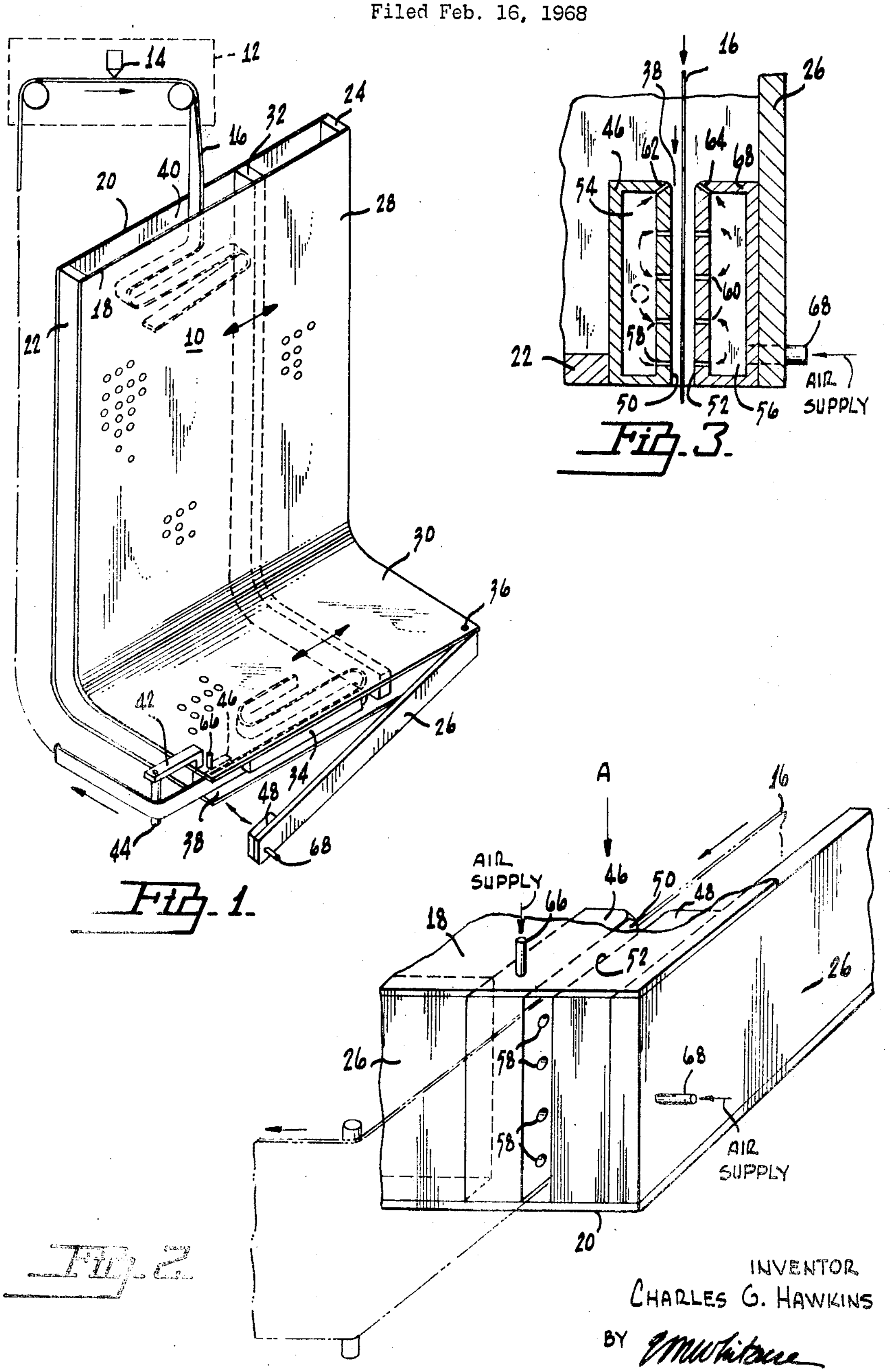
FIG. 1 is a pictorial view in diagrammatic form of a tape storage basket embodying the features of the present invention.
FIG. 2 is an enlarged fragmentary view of the bottom end portion of the basket of FIG. 1 with the end wall in its normally closed position and showing the stripper apparatus of the present invention.
FIG. 3 is an enlarged partial plan view in section taken in the general direction of arrow A in FIG. 2.

Referring now to the drawing, and in particular to FIG. 1, a preferred embodiment of a basket 10 including the stripper apparatus of the present invention is shown in cooperative association with a master transport, shown generally by the block 12, the transport having a transducer 14 arranged for scanning a traveling endless loop magnetic tape 16.

The basket 10 may be in the form of a thin box-like framed enclosure having parallel front and back cover members 18 and 20 spaced apart by parallel side walls 22 and 24 and a bottom end wall 26. In FIG. 1, the end wall 26 is shown in its open position so as to facilitate loading of the tape into the basket as will hereinafter be described. The end wall 26 is shown in its normally closed position in FIG. 2. The central lengthwise portions of the front, back and side walls are arcuately shaped to provide an enclosure structure having a gradually curved transition from a vertically extending upper portion 28 to a horizontally disposed lower portion 30, the basket 10 thereby taking on an L-shaped appearance.

Referring again to FIG. 1, the basket is seen to include an additional side wall member 32 positioned for lateral movement within the enclosure tape storage area and parallel to the side walls 22 and 24. The wall member 32 is mounted within the enclosure such that it can be moved back and forth as indicated by the double arrows in FIG. 1, along the length of the end wall 26, thereby to enable the width of the basket storage area to be adjusted to a desired dimension. In this manner the storage basket can be suitably used in conjunction with different lengths of tape, with the basket width being adjusted so that the stored tape substantially fills the lengthwise height of the basket.

As shown in FIG. 1, an end wall segment 34 is affixed near the lower extremity of the cover member 18 so as to form a partial shelf for supporting the stored tape strands. The bottom end wall 26 is attached to the basket by a hinge 36 or other suitable means so as to be separable therefrom. The separable nature of the end wall 26 provides a means of outside access to the lower portion 30 of the basket for threading the leading end of a received tape strand through a tape exit opening 38 as will be hereinafter described.

A tape entrance 40 is provided in the basket upper portion 28 at the end boundaries of the cover walls 18 and 20 and the side walls 27 and 32. While the basket is shown as being completely open at its upper portion end boundary to define a tape entrance 40, it will be understood that the top of the basket upper portion 28 could include an end wall having a central opening therein to receive the tape into the basket.

Affixed near the exit opening 38 and overhanging the side wall 22 is a bracket 42. A guide pin 44 depends from the overhanging portion of the bracket in alignment with the tape exit opening 38. Thus, tape issuing from the exit opening 38 may be directed around pin 44 and up towards the transport 12 for scanning by the transducer 14.

Preferably, the basket is constructed of a non-magnetic material such as aluminum or stainless steel, with one or both cover portions being perforated as shown in the figures. For use and operation, the basket is positioned relative to the tape transport so that a continuous tape feed available from the transport is directed downwardly into the basket entrance opening 40. Initial tape loading or storage in the basket may be accomplished as follows.

First, the basket width is adjusted in accordance with the length of the prerecorded tape to be stored in the basket so as to provide for a distribution of the tape in the vertical as well as curved and horizontal portions of the basket. This is accomplished by positioning the moveable wall member 32 at some suitable distance along the length of the end wall 26, as for example, the position in phantom view in the figure. The basket may then, if necessary, be repositioned relative to the transport tape feed so as to receive the tape vertically and without restriction within the opening bounded by the front and back walls 18 and 20, side wall 22 and the moveable side member 32.

Next, the vertical storage passage portion of the basket must be closed off from the rest of the basket so as to allow the received tape 16 to store only in the vertical portion 28 of the basket during the first phase of the loading operation. In the embodiment shown, blocking of the passageway may be accomplished by inserting the fingers of a rake-like device (not shown) through the perforated openings in the cover portion 18 so as to form a barrier or shelf within the basket passageway to support the serpentine turns of tape to be stacked thereabove. The purpose of blocking the passageway is to insure that during tape loading, the first portion of entering tape will not be influenced by any frictional contact with the curved walls in the central portion, and thereby disrupt the distribution of their serpentine folds of tape as it stacks for storage within the basket.

Upon removal of the rake fingers from the perforated openings in the cover portion of the basket, the tape folds will then distribute themselves throughout the curved basket portion and the rest of the basket passageway. The bottom end of the basket may then be opened to allow entry into the passageway retrieving and threading the leading edge of the tape through the exit opening in the side wall 22. From the exit opening 38, the leading end of the tape is directed around the guide pin 44 towards the transport to be spliced to the trailing end of the master tape roll. To complete the tape loading operation the remainder of the master tape roll is then caused to be fed through the entrance opening 40 and into the basket for storage therein with the trailing tape end being prevented from entering the basket by suitable means so as to allow it to be spliced to the leading end of the tape to form a continuous endless tape loop. Thus, during operation of the transport and basket, the major portion of a traveling endless loop magnetic tape will be stored in the basket enclosure.

Details of the tape stripper apparatus of the present invention will now be described, with attention being directed to FIGS. 2 and 3 of the drawing. As shown therein the exit opening 38 is bounded by a pair of parallel rectangular shaped wall blocks 46 and 48, with the exit opening 38 defined by the slot or channel formed between opposing parallel surfaces 50 and 52 of the respective wall blocks 46 and 48. As shown in FIG. 3, each wall block includes a central cavity, indicated as 54 and 56 for the respective blocks 46 and 48, and a plurality of passageways 58 and 60 respectively, perpendicular to the plane of the exit opening 38 and communicating between the exit opening 38 and the respective block cavities 54 and 56. The corner edges of the block surfaces forming the basket entrance to the tape exit opening are rounded and include at least one pair of opposed or complementary passageways 62 and 64 communicating between the respective block cavities 54 and 56 and the basket storage area. Extending out from each of the cavities 54 and 56 and through the basket walls are tube members 66 and 68 respectively. The tubes are adapted to be connected to a source of compressed air (not shown) so as to provide for the tape stripping action of the present invention as will be hereinafter described.

Referring again to FIG. 3, it will be seen that the direction or orientation of the passageways 62 and 64 is such that compressed air forced through the passageways 62 and 64 will be directed toward both sides of the entering tape 16 and away from the basket entrance to the tape exit opening 38. Directed in this manner, the compressed air flow provides a tape stripping action in that it prevents the tape strands approaching the tape exit opening from clinging to one another. This ensures that only one strand of tape will be drawn through the exit opening channel at any given time. In addition, the air flow directed through the other passageways 58 and 60 opening into the channel tape exit opening 38 provides in effect, an air bearing for the tape drawn therethrough, thereby minimizing tape wear due to possible frictional contact with the wall surfaces of the channeled opening.

Preferably, as shown in FIG. 3, the axis of the passageways 62 and 64 each define an angle of approximately 45 degrees with the plane of the exit opening channel, thereby to direct the compressed air flow in the desired direction toward the tape 16 and away from the opening 38.

What is claimed is:

1. In a receptacle for storing magnetic tape in a plurality of serpentine layers, said receptacle having an input opening for receiving the magnetic tape, and an output opening through which the lower most layer of said tape extends, the improvement comprising:

means including a first, a second and a third passageway each providing a forced flow of air;

said first passageway disposed adjacent said output opening for providing a forced flow of air directed toward the interior of said receptacle and between the lower most and next succeeding layers of tape;

said second passageway disposed to provide a forced flow of air directed toward a first side of said lower most layer of tape; and said third passageway disposed to provide a forced flow of air directed toward a second side of said lower most layer of tape.

2. In a receptacle for storing magnetic tape in serpentine fashion, said receptacle having an input opening for receiving the magnetic tape, and an output opening for expending the magnetic tape, the improvement comprising:

a first means to discharge a fluid in a first direction away from said output opening and against the tape being drawn therethrough and in a second direction against the tape;

a second means to discharge a fluid in a direction away from said output opening and against the tape being drawn therethrough; and each of said means being disposed adjacent said output opening and directed toward respectively opposite sides of the tape entering said output opening.

3. A receptacle as set forth in claim 2 wherein said first and second means each include at least one passageway opening into said receptacle along respectively complementary axes to define a discharge path for said fluid.

4. A receptacle as set forth in claim 3 and further including means cooperating with said first and second discharge means to provide a forced flow of air through said passageways.

5. In a receptacle for storing magnetic tape in serpentine fashion, said receptacle having an input opening for receiving the magnetic tape, and an output opening in one wall thereof for expending the magnetic tape, the improvement comprising:

a first means adapted to discharge air in a direction away from said output opening and against the tape being drawn therethrough; and a second means adapted to discharge air in a direction away from said opening and against the tape being drawn therethrough;

each of said means including a block member having a central cavity therein, each of said blocks being positioned against respectively opposing surfaces of the receptacle wall portions defining said output opening so as to form a channel therebetween through which the expending tape is arranged to pass.

6. A receptacle as set forth in claim 5 wherein the opposing corner portions of said block members forming a tape entrance to said channel each includes at least one passageway communicating between a respective block cavity and the entrance of said channel, the direction of orientation of said passageway being such that an air flow through said passageways will be directed toward both sides of the entering tape and away from the tape channel entrance.

7. A receptacle as set forth in claim 6 wherein the axes of said passageway each define an angle of substantially 45 degrees with the plane of the channel as extended from its entrance.

8. A receptacle as set forth in claim 6 wherein each of said block members includes at least one passageway communicating between said channel and their respectively associated block cavities, the axes of said passageways being respectively perpendicular to the plane of said channel at its point of contact therewith.

References Cited

UNITED STATES PATENTS

| | | | |
|---|---|---|---|
| 2,962,200 | 11/1960 | Pouliart | 226—97 X |
| 2,995,313 | 8/1961 | Namenyi-Katz | 226—97 X |
| 3,185,400 | 5/1965 | Maxey | 226—118 X |

RICHARD A. SCHACHER, Primary Examiner

U.S. Cl. X.R.

226—118